United States Patent
An et al.

(10) Patent No.: US 11,999,291 B2
(45) Date of Patent: Jun. 4, 2024

(54) INDOOR LIGHTING DEVICE OF A VEHICLE AND A LIGHTING CONTROL SYSTEM INCLUDING THE SAME

(71) Applicants: HYUNDAI MOTOR COMPANY, Seoul (KR); KIA CORPORATION, Seoul (KR); ITW EF & C Korea LLC., Incheon (KR); HYUNDAI MOBIS CO., LTD., Seoul (KR); YOONJIN ELECTRONICS CO., LTD, Gwangmyeong-si (KR)

(72) Inventors: Jae Hyun An, Seosan-si (KR); Jun Geun Oh, Hwaseong-si (KR); Kyu Rok Kim, Hwaseong-si (KR); Byoung Wook Kim, Gunpo-si (KR); Young Jun Kim, Yongin-si (KR); Goo Dong Jung, Incheon (KR); Ho Sung Kwon, Incheon (KR); Bong Seok Ko, Seoul (KR)

(73) Assignees: HYUNDAI MOTOR COMPANY, Seoul (KR); KIA CORPORATION, Seoul (KR); ITW EF&CKorea LLC., Incheon (KR); HYUNDAI MOBIS CO., LTD., Seoul (KR); YOONJIN ELECTRONICS CO., LTD, Gwangmyeong-si (KR)

( * ) Notice: Subject to any disclaimer, the term of this patent is extended or adjusted under 35 U.S.C. 154(b) by 0 days.

(21) Appl. No.: 18/200,157

(22) Filed: May 22, 2023

(65) Prior Publication Data
US 2024/0034229 A1  Feb. 1, 2024

(30) Foreign Application Priority Data
Jul. 29, 2022  (KR) .......................... 10-2022-0094882

(51) Int. Cl.
*B60Q 3/66* (2017.01)
*B60Q 3/70* (2017.01)
(Continued)

(52) U.S. Cl.
CPC ................. *B60Q 3/66* (2017.02); *B60Q 3/70* (2017.02); *B60Q 3/80* (2017.02); *B60Q 9/00* (2013.01);
(Continued)

(58) Field of Classification Search
CPC ... B60Q 3/66; B60Q 3/80; B60Q 3/70; B60Q 9/00; B60Q 3/62; B60Q 3/00; B60Q 3/16;
(Continued)

(56) References Cited

U.S. PATENT DOCUMENTS

| | | | |
|---|---|---|---|
| 6,587,573 B1 * | 7/2003 | Stam | B60Q 1/143 |
| | | | 382/104 |
| 2002/0130326 A1 * | 9/2002 | Tamura | F21K 9/00 |
| | | | 257/E33.076 |

(Continued)

FOREIGN PATENT DOCUMENTS

KR  0120685 Y1  7/1998

*Primary Examiner* — Bao Q Truong
(74) *Attorney, Agent, or Firm* — Lempia Summerfield Katz LLC

(57) ABSTRACT

An indoor lighting device of a vehicle includes: a substrate, a plurality of light sources assembled with the substrate to be arranged in a row, and a light guide panel including: a plurality of incidence parts such that light emitted by the light sources is incident thereupon, a diffusion area part provided behind the incidence parts to diffuse and reflect the light incident upon the incidence parts, a visual field area part provided behind the diffusion area part to emit the light diffused and reflected by the diffusion area part outside, and light diffusion holes provided behind the respective inci- (Continued)

dence parts. In particular, each of the light diffusion holes is surrounded by a transmission plane, a pair of reflection planes and a diffusion plane.

22 Claims, 14 Drawing Sheets

(51) Int. Cl.
    *B60Q 3/80*     (2017.01)
    *B60Q 9/00*     (2006.01)
    *F21V 8/00*     (2006.01)
    *H05B 47/115*     (2020.01)

(52) U.S. Cl.
    CPC ......... *G02B 6/0018* (2013.01); *G02B 6/0068* (2013.01); *H05B 47/115* (2020.01)

(58) Field of Classification Search
    CPC .. G02B 6/0018; G02B 6/0068; G02B 6/0011; G02B 6/0015; H05B 47/115; H05B 47/105; F21V 23/0442; F21V 2200/20
    See application file for complete search history.

(56) References Cited

U.S. PATENT DOCUMENTS

2012/0203432 A1*   8/2012   Lukacs ............... B60Q 1/0041
                                                                             701/42
2015/0085512 A1*   3/2015   Kim ....................... F21S 43/14
                                                                             362/520

* cited by examiner

INDOOR LIGHTING DEVICE OF A VEHICLE AND A LIGHTING CONTROL SYSTEM INCLUDING THE SAME

CROSS-REFERENCE TO RELATED APPLICATION

This application claims under 35 U.S.C. § 119(a) the benefit of and priority to Korean Patent Application No. 10-2022-0094882, filed on Jul. 29, 2022, the entire contents of which are incorporated herein by reference.

BACKGROUND

(a) Technical Field

The present disclosure relates to an indoor or interior lighting device of a vehicle and a lighting control system including the same.

(b) Background Art

In general, Light Emitting Diodes (LEDs) are applied to indoor or interior lighting devices for vehicles, and are used as mood lighting by controlling the color and the brightness of the LEDs.

In conventional indoor lighting devices, the LEDs are controlled to have the same color and brightness. Thus, conventional indoor lighting devices are used as simple indoor lighting.

In the indoor lighting device for a vehicle, when a plurality of LEDs are used, lighting uniformity is reduced due to a luminance difference between the LEDs and surroundings, and thus quality degradation and appearance degradation occur.

Further, when the indoor lighting device for a vehicle includes a plurality of LEDs, it is impossible to individually control the LEDs through one controller. Thus, the number of controllers and the number of lines needed increase with the number of the LEDs, and thus, cause an increase in costs.

Therefore, the conventional indoor lighting devices for vehicles are being used only mood lighting for interiors.

The above information disclosed in this Background section is provided only to enhance understanding of the background of the disclosure. Therefore, the Background section, may contain information that does not form the prior art that is already known to a person of ordinary skill in the art.

SUMMARY OF THE DISCLOSURE

The present disclosure has been made in an effort to solve the above-described problems associated with the prior art, and it is an object of the present disclosure to provide an indoor lighting device of a vehicle which implements uniform illuminance, and a lighting control system of a vehicle which provides visual information to a user through control of the indoor lighting device.

In one aspect, the present disclosure provides an indoor lighting device of a vehicle. The indoor lighting device includes; a substrate; a plurality of light sources assembled with the substrate so as to be arranged in a row; and a light guide panel including a plurality of incidence parts configured such that light emitted by the light sources is incident upon the plurality of incidence parts. The light guide panel includes: a diffusion area part provided behind the incidence parts and configured to diffuse and reflect the light incident upon the incidence parts; a visual field area part provided behind the diffusion area part and configured to emit the light diffused and reflected by the diffusion area part to an outside of the indoor lighting device; and light diffusion holes provided behind the respective incidence parts and configured such that each of the light diffusion holes is surrounded by a transmission plane, a pair of reflection planes and a diffusion plane.

In one embodiment, the transmission plane is formed in a corresponding incident part among the plurality of incidence parts so as to face a corresponding light source among the plurality of light sources. The transmission plane is configured to transmit a part of the light emitted by the corresponding light sources, the diffusion plane is configured to diffuse light, having transmitted by the transmission plane and having passed through a corresponding light diffusion hole among the light diffusion holes, to the visual field area part. The respective reflection planes are configured to reflect a part of the light emitted by the corresponding the light source to an outside of the corresponding light diffusion hole so as to radiate the part of the light to the visual field area part.

In an embodiment, the transmission plane may be formed in a curved surface bent to be convex towards the corresponding light source, a diffusion plane may be formed in the diffusion area part and may be formed in a curved surface bent to be convex towards the visual field area part, and the respective reflection planes may be formed as inclined surfaces having a predetermined inclination between the transmission plane and the diffusion plane. Further, the light diffusion holes may be formed to have a fan-shaped cross section.

In another embodiment, the incidence parts may protrude from a lower part of a front surface of the diffusion area part, the visual field area part may extend from an upper part of a rear surface of the diffusion area part, and the diffusion area part may have an inclined plane configured to reflect at least a part of light, radiated to the visual field area part through the diffusion plane, to the visual field area part. The inclined plane may be formed on a rear surface of the diffusion area part so as to be inclined, and may be provided adjacent to the visual field area part.

In another aspect, the present disclosure provides a lighting control system of a vehicle. The lighting control system includes: a light source module including a plurality of light sources arranged in a row so as to be spaced apart from each other by a predetermined distance, the light source module disposed in an interior of the vehicle, a sensor module configured to detect a driving state of the vehicle, and a controller configured to sequentially turn on the plurality of light sources at a predetermined turning-on interval based on information received from the sensor module.

In an embodiment, the light sources may be sequentially turned on in a direction of arrangement thereof by the controller.

In another embodiment, the controller may turn on a first light source at a predetermined luminance, when the controller turns on the first light source, and may turn on a second light source at the predetermined luminance and simultaneously increase the luminance of the first light source by a predetermined ratio, when the controller turns on the second light source.

In still another embodiment, the distance between the light sources may be 15 mm to 30 mm, and the turning-on interval between the light sources may be 20 ms to 30 ms.

In yet another embodiment, the light source module may include; a substrate; a plurality of light sources assembled with the substrate so as to be arranged in a row; and a light guide panel including a plurality of incidence parts configured such that light emitted by the light sources is incident upon the plurality of incidence parts, a diffusion area part provided behind the incidence parts and configured to diffuse and reflect the light incident upon the incidence parts, a visual field area part provided behind the diffusion area part and configured to emit the light diffused and reflected by the diffusion area part to an outside of the light source module, and light diffusion holes provided behind the respective incidence parts and configured such that each of the light diffusion holes is surrounded by a transmission plane, a pair of reflection planes and a diffusion plane. The transmission plane may be formed in a corresponding one of the incidence parts so as to face a corresponding one of the light sources and may be configured to transmit a part of the light emitted by the corresponding one of light sources, the diffusion plane may be configured to diffuse light, having transmitted by the transmission plane and having passed through a corresponding one of the light diffusion holes, to the visual field area part, and the respective reflection planes may be configured to reflect a part of the light emitted by the corresponding one of the light sources to an outside of the corresponding one of the light diffusion holes so as to radiate the part of the light to the visual field area part.

Other aspects and embodiments of the disclosure are discussed infra.

The above and other features of the disclosure are discussed infra.

BRIEF DESCRIPTION OF THE DRAWINGS

The above and other features of the present disclosure are described in detail with reference to certain embodiments thereof illustrated in the accompanying drawings which are given hereinbelow by way of illustration only, and thus are not limitative of the present disclosure, and wherein.

Figure 1:
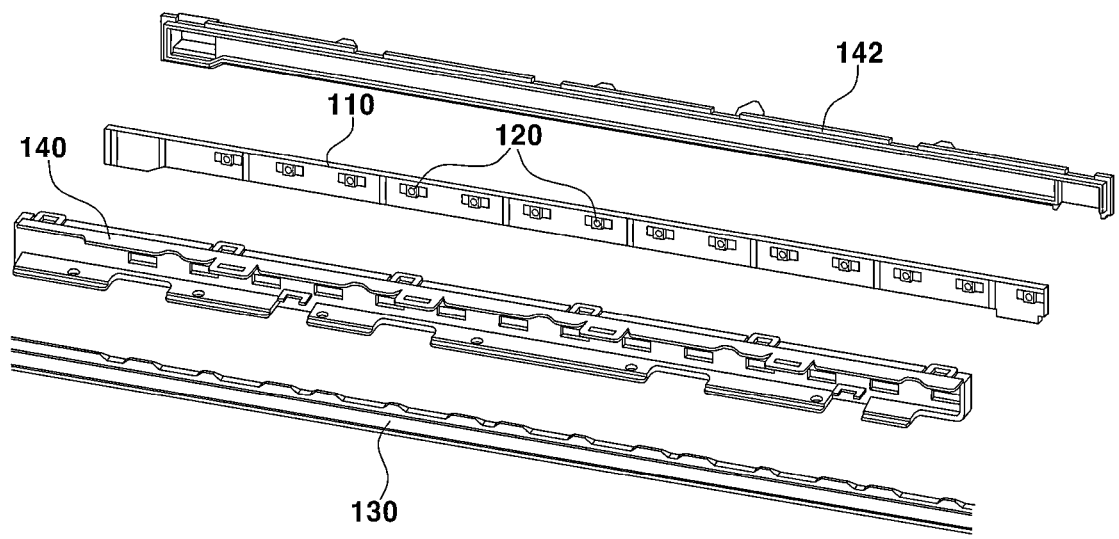
FIG. 1 is a perspective view showing some elements of an indoor lighting device of a vehicle according to one embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment. The drawings described herein are for illustration purposes only and are not intended to limit the scope of the present disclosure in any way.

In the figures, reference numbers refer to the same or equivalent parts of the present disclosure throughout the several figures of the drawing.

DETAILED DESCRIPTION

Specific structural or functional descriptions of embodiments of the present disclosure set forth in the description which follows are provided by way of example and are provided to describe the embodiments of the present disclosure. However, the present disclosure may be embodied in many alternative forms.

Further, when a part is referred to as "comprising" an element, the part does not exclude other elements, and may further include other elements unless the context clearly indicates otherwise.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

In addition, in the following description of the embodiments, it should be understood that the suffixes "part", "module", etc. indicate units for processing at least one function or operation, and may include software operated by a set program, or hardware including electronic elements, or a combination module including a combination of software and hardware.

When a component, device, element, or the like of the present disclosure is described as having a purpose or performing an operation, function, or the like, the component, device, or element should be considered herein as being "configured to" meet that purpose or to perform that operation or function.

Hereinafter, the present disclosure is described in detail with reference to the accompanying drawings. First, indoor lighting devices of vehicles according to embodiments of the present disclosure are described with reference to FIGS. 1-18.

Figure 2:
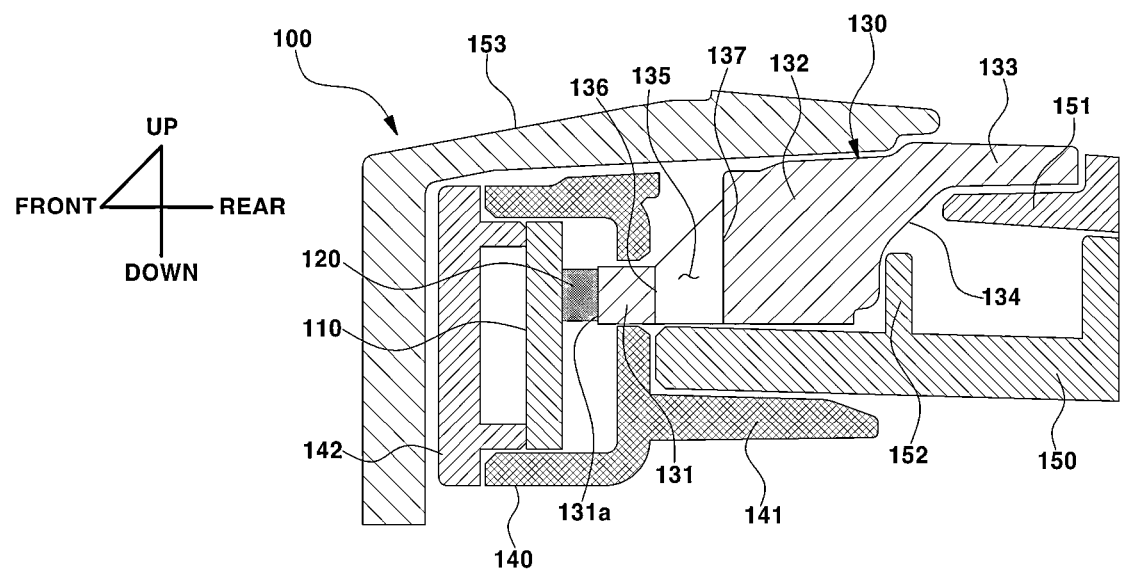
FIGS. 2 and 3 are cross-sectionals view showing the indoor lighting device according to one embodiment of the present disclosure.
Figure 3:
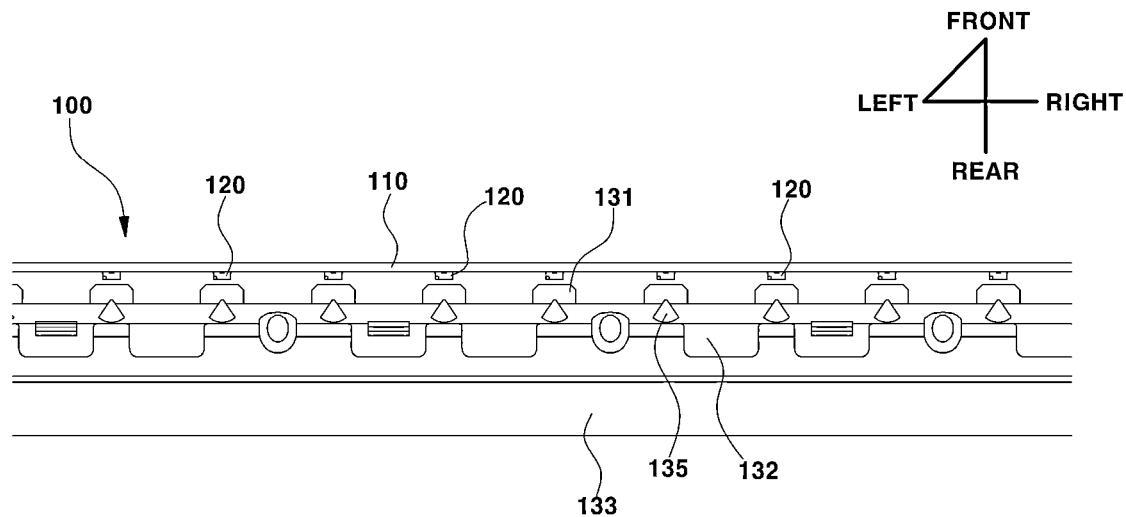
Figure 4:
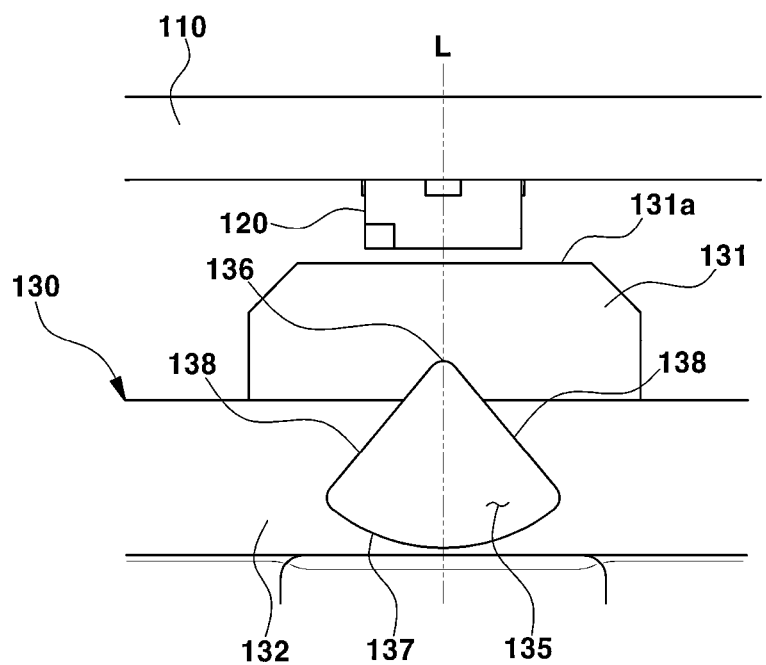
FIG. 4 is an enlarged view of a portion of FIG. 3.
Figure 5:
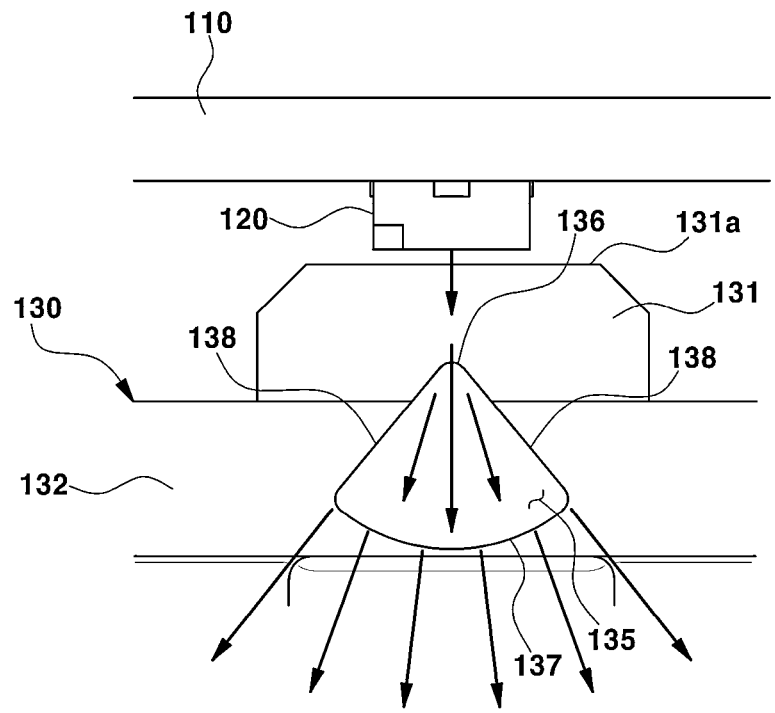
FIG. 5 is a view schematically illustrating the state in which light radiated by a light source according to the present disclosure is diffused by a light guide panel.
Figure 6:
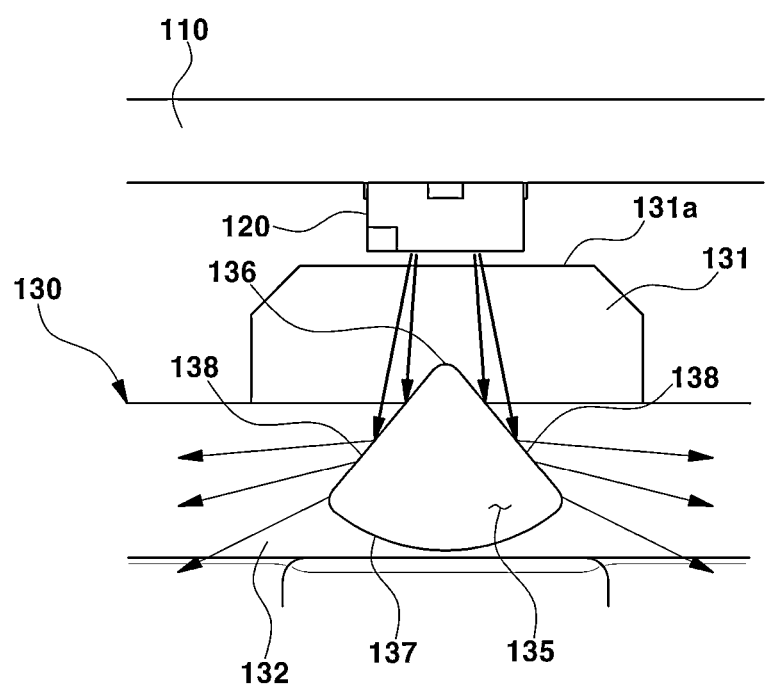
FIG. 6 is a view schematically illustrating the state in which light radiated by the light source according to the present disclosure is radiated by the light guide panel.
Figure 7:
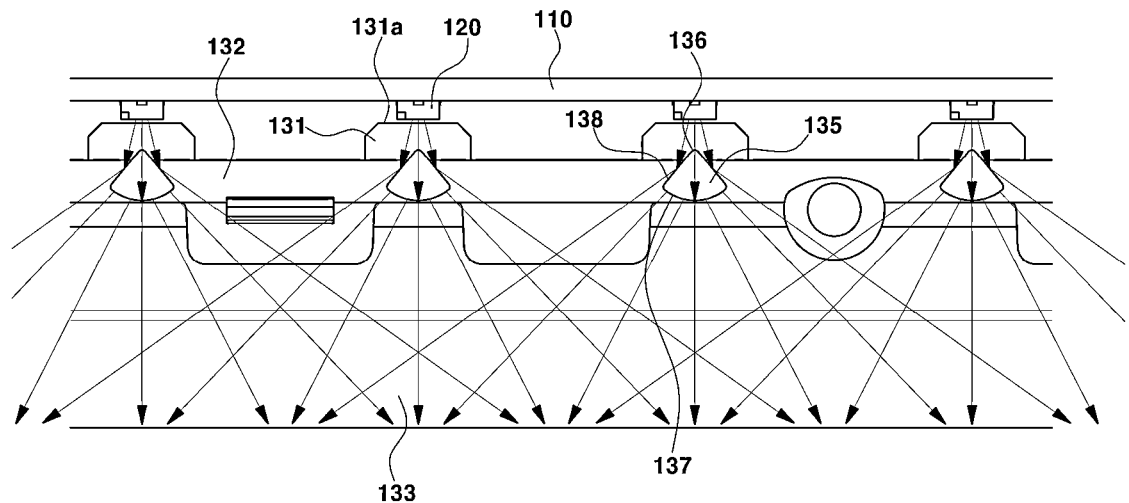
FIG. 7 is a view schematically illustrating the state in which light radiated by light sources according to the present disclosure is diffused and reflected by a diffusion area part and is radiated to a visual field area part.
Figure 8:
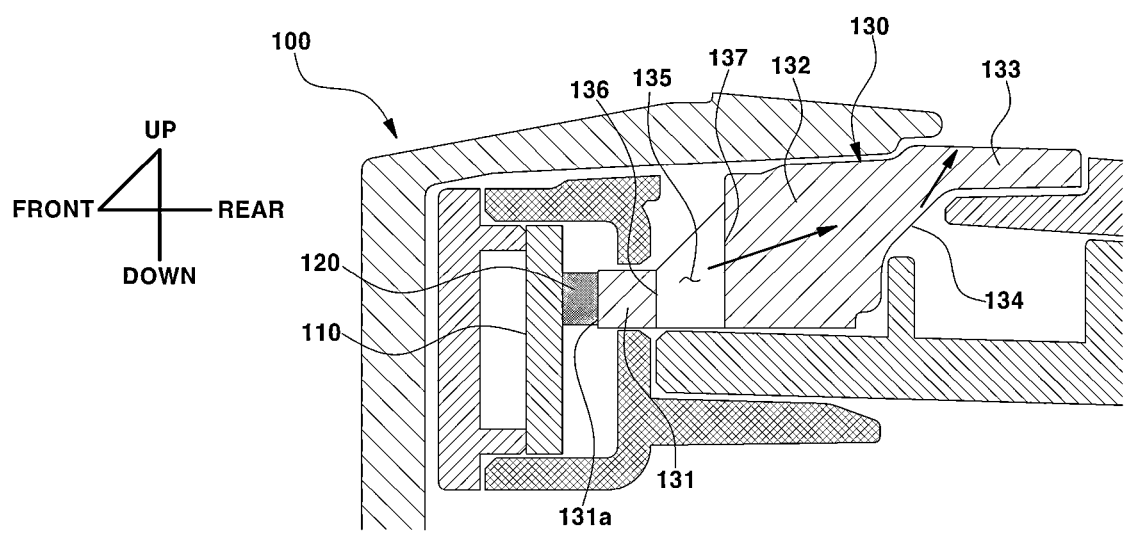
FIG. 8 is a view schematically illustrating the state in which light radiated by the light sources according to the present disclosure is reflected by an inclined plane of the light guide panel and is radiated to the visual field area part.

FIG. 1 is a perspective view showing some elements of an indoor lighting device of a vehicle according to one embodiment of the present disclosure. FIGS. 2 and 3 are cross-sectionals view showing the indoor lighting device according to one embodiment of the present disclosure. FIG. 4 is an enlarged view of a portion of FIG. 3. FIG. 5 is a view schematically illustrating the state in which light radiated by a light source according to the present disclosure is diffused by a light guide panel. FIG. 6 is a view schematically illustrating the state in which light radiated by the light source according to the present disclosure is radiated by the light guide panel. FIG. 7 is a view schematically illustrating the state in which light radiated by light sources according to the present disclosure is diffused and reflected by a diffusion area part and is radiated to a visual field area part. FIG. 8 is a view schematically illustrating the state in which light radiated by the light sources according to the present disclosure is reflected by an inclined plane of the light guide panel and is radiated to the visual field area part.

Figure 9A:
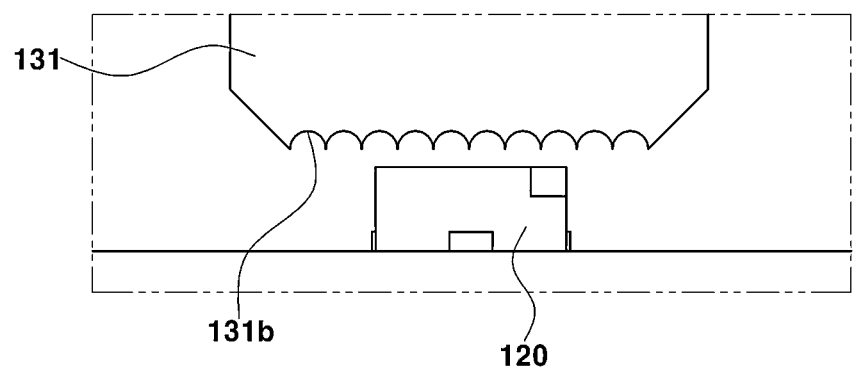
FIGS. 9A and 9B are views showing incidence planes according to other embodiments of the present disclosure.
Figure 9B:
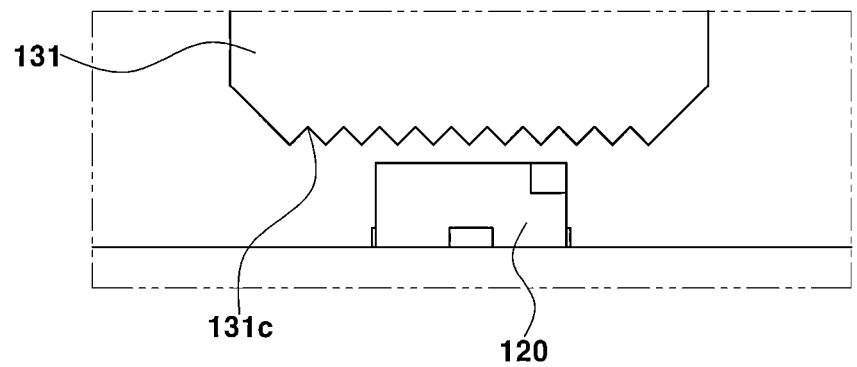
Figure 10:
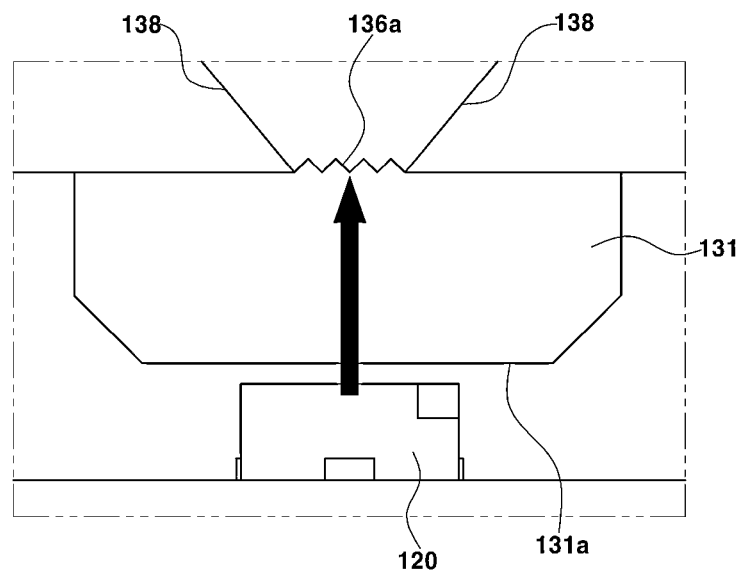
FIG. 10 is a view showing a transmission surface according to another embodiment of the present disclosure.
Figure 11A:
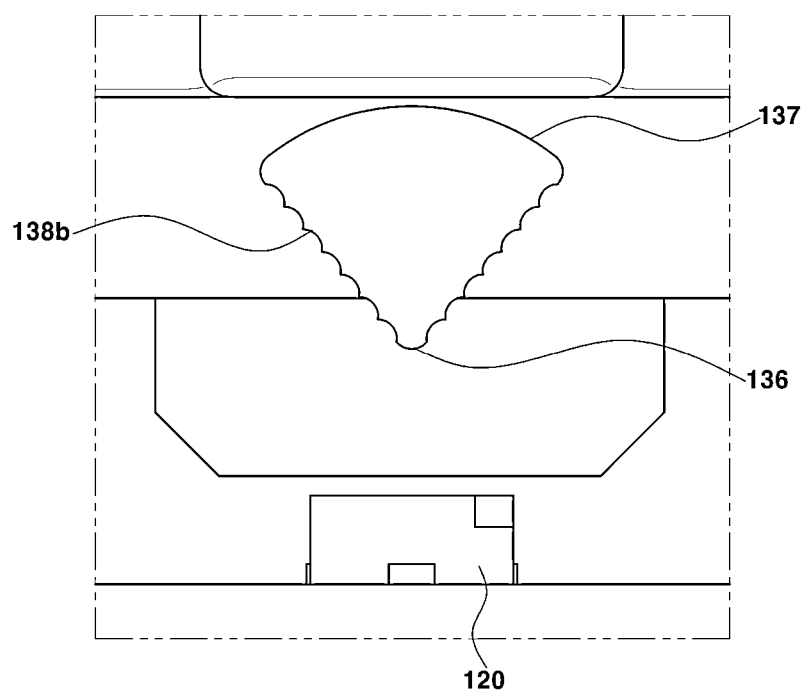
FIGS. 11A and 11B are views showing reflection surfaces according to other embodiments of the present disclosure.
Figure 11B:
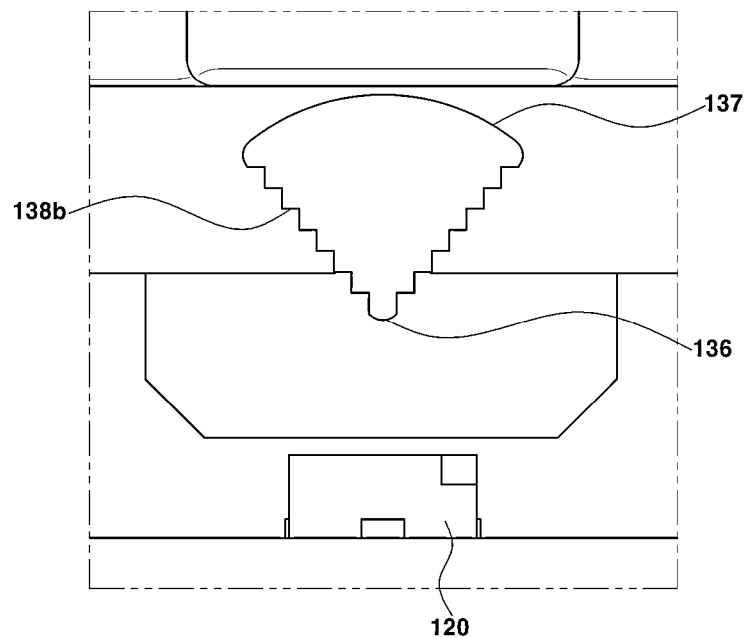
Figure 12A:
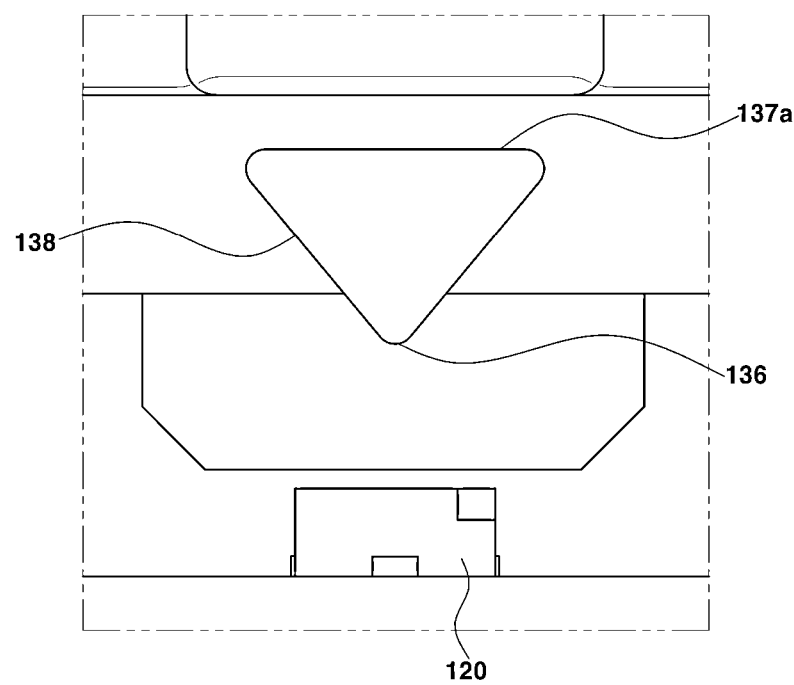
FIGS. 12A-12C are views showing diffusion surfaces according to other embodiments of the present disclosure.
Figure 12B:
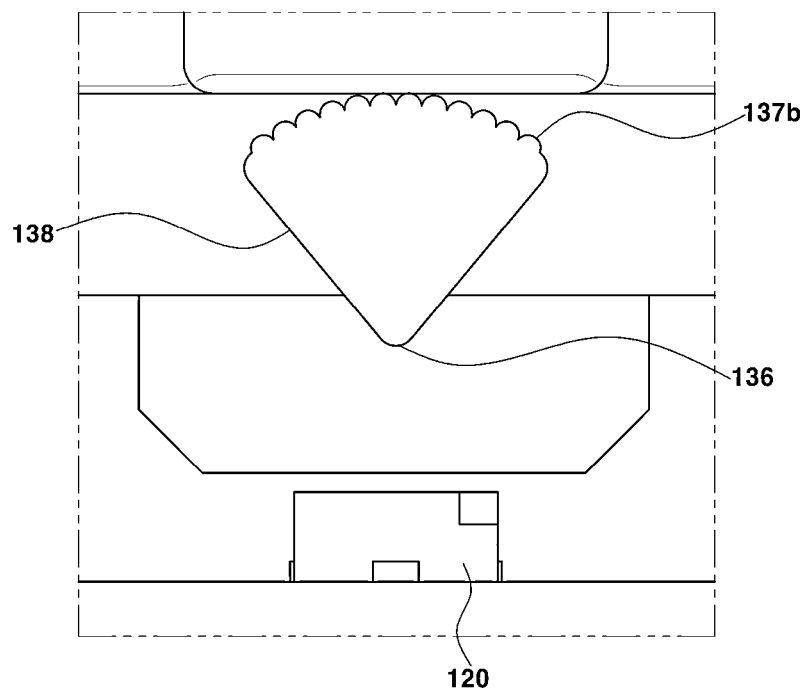
Figure 12C:
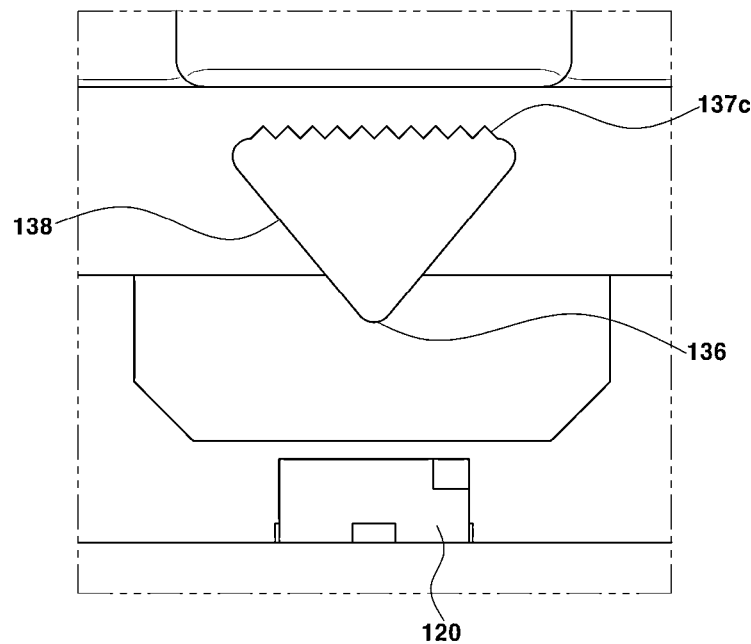

Further, FIGS. 9A and 9B are views showing incidence planes according to other embodiments of the present disclosure. FIG. 10 is a view showing a transmission surface according to another embodiment of the present disclosure. FIGS. 11A and 11B are views showing reflection surfaces according to other embodiments of the present disclosure. FIGS. 12A-12C are views showing diffusion surfaces according to other embodiments of the present disclosure.

Figure 18:
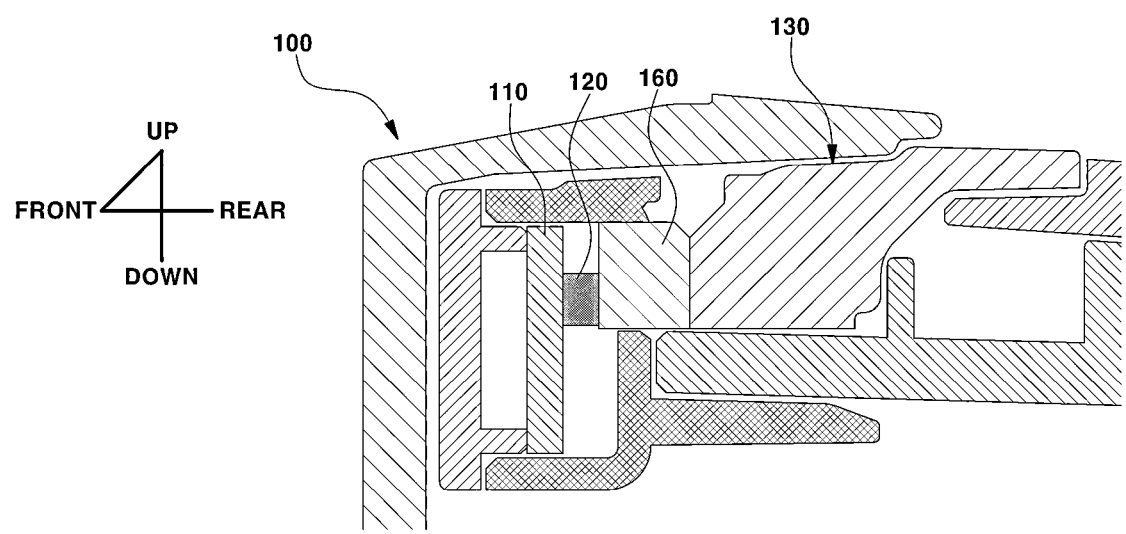
FIG. 18 is a view showing a light guide panel employing lenses according to another embodiment of the present disclosure.

In addition, FIGS. 13-17 are views showing indoor lighting devices including light guide panels according to other embodiments of the present disclosure. FIG. 18 is a view showing a light guide panel employing lenses according to another embodiment of the present disclosure.

As shown in FIGS. 1-3, an indoor lighting device of a vehicle according to one embodiment of the present disclosure includes a substrate 110, a plurality of light sources 120 assembled with the substrate 110, and a light guide panel 130 configured to emit light incident from the light sources 120 at uniform illuminance. Further, the indoor lighting device includes a substrate housing 140, a substrate cover 142, a light guide panel housing 150, and a light guide panel cover 153. The indoor lighting deice may be referred to as a light source module 100.

The substrate 110 serves to support the light sources 120 and to electrically connect the light sources 120 to each other. Further, the substrate 110 electrically connects the light sources 120 to a power supply, a controller, and the like. The substrate 110 may employ or include a Printed Circuit Board (PCB).

Referring to FIGS. 1-3, the substrate 110 is formed to have a relatively short width and a relatively long length. The light sources 120 may be mounted on the substrate 110 so as to be arranged in a row. The light sources 120 may be arranged in the length direction of the substrate 110. Referring to FIG. 3, the light sources 120 may be arranged in the leftward and rightward directions.

Here, the upward and downward directions, the forward and rearward directions, and the leftward and rightward directions are set based on FIGS. 2 and 3. These directions shown in FIGS. 2 and 3 may differ from the upward and downward directions, the forward and rearward directions, and the leftward and rightward directions of the vehicle.

The light sources 120 may be connected in series through the substrate 110, and Light Emitting Diodes (LEDs) are used as the light sources 120. Concretely, Intelligent Smart Embedded Light Emitting Diodes (ISELEDs) are used as the light sources 120. Hereinafter, the ISELEDs are referred to as "Smart LEDs".

The Smart LED is provided as one chip including Red, Green and Blue (RGB) LEDs and an LED driver. The LED driver controls operation of the RGB LEDs based on a signal received from the controller.

As shown in FIGS. 2 and 3, the light guide panel 130 includes a plurality of incidence parts 131 onto which light emitted by the light sources 120 is incident, a diffusion area part 132 disposed behind the incidence parts 131, and a visual field area part 133 disposed behind the diffusion area part 132.

The incidence parts 131 protrude from the front surface of the diffusion area part 132 and are arranged to individually face the light sources 120. Here, the respective incidence parts 131 face the light sources 120 one to one. The number of the incidence parts 131 provided on the light guide panel 130 and the number of the light sources 120 assembled with the substrate 110 are the same.

The respective incidence parts 131 may be formed as a polyhedron. Each of the incidence parts 131 has an incidence plane 131a onto which light from a corresponding one of the light sources 120 is directly incident. The incidence planes 131a face the light sources 120. As shown in FIG. 4, the incidence planes 131a may be formed as flat surfaces. In another form, as shown in FIGS. 9A and 9B, incidence planes 131b may be as a curved surface having a plurality of concave part which are continuously formed, or incidence planes 131c may be formed as an uneven surface having a serration-shaped cross-section.

The diffusion area part 132 is configured to diffuse and reflect light incident through the incidence parts 131. The diffusion area part 132 diffuses and reflects light incident from the incidence parts 131 and transmits the diffused and reflected light to the visual field area part 133.

The visual field area part 133 emits the light received from the diffusion area part 132 to the outside of the light source module 100 so that a user may recognize the emitted light with the naked eye.

Here, the diffusion area part 132 is formed to extend from the incidence parts 131 to the visual field area part 133 and has a thickness in the upward and downward directions which is several times those of the incidence parts 131 and the visual field area part 133.

Further, the incidence parts 131 protrude from the lower part of the front surface of the diffusion area part 132, and the visual field area part 133 extends from the upper part of the rear surface of the diffusion area part 132. In other words, the visual field area part 133 is located above the incidence parts 131.

In order to compensate for reduction in luminance due to a phase difference (i.e., a height difference) between the incidence parts 131 and the visual field area part 133, at least a part of the rear surface of the diffusion area part 132 is inclined rearwards. In other words, the rear surface of the diffusion area part 132 has an inclined plane 134 configured to reflect at least a part of light received from the incidence parts 131 towards the visual field area part 133.

As shown in FIG. 2, the inclined plane 134 is provided in an upper area of the rear surface of the diffusion area part 132 which is adjacent to the visual field area part 133. The inclined plane 134 is applied to the upper area of the rear surface of the diffusion area part 132 which is adjacent to the lower surface of the visual field area part 133. In another embodiment, although not shown in the drawings, the inclined plane 134 may be applied to the entirety of the rear surface of the diffusion area part 132.

Light received from the incidence parts 131 is diffused or reflected by the diffusion area part 132 and then moved to the visual field area part 133. Here, at least a part of the light diffused or reflected by the diffusion area part 132 is incident upon the inclined plane 134 and is reflected towards the visual field area part 133 through the inclined plane 134, as shown by arrows in FIG. 8.

In order to provide lighting having uniform illuminance to the visual field area part 133, the light guide panel 130 may include a plurality of light diffusion holes 135, as shown in FIG. 3.

As shown in FIGS. 2-4, the respective light diffusion holes 135 are formed through the light guide panel 130 in the upward and downward directions. The light diffusion holes 135 are formed to have a fan-shaped cross section. The light diffusion holes 135 are vacant spaces formed to have a fan-shaped cross section.

Concretely, the respective light diffusion holes 135 are formed in a structure surrounded by a transmission plane 136, a pair of reflection planes 138, and a diffusion plane 137. Each of the light diffusion holes 135 is completely surrounded by the transmission plane 136, the pair of reflection planes 138 and the diffusion plane 137.

The transmission plane 136 is formed to face the light source 120 and the incidence plane 131a. As shown by an arrow in FIG. 5, the transmission plane 136 transmits at least a part of light, having entered into the light guide panel 130 through the incidence plane 131a, towards the inside of the light diffusion hole 135. In other words, at least a part of the light, having entered into the light guide panel 130 through the incidence plane 131a, is refracted by the transmission plane 136 and enters the light diffusion hole 135.

The transmission planes 136 are provided at positions which face the light source 120 in the forward and rearward directions and are located in a straight line which be at right angles to the direction of arrangement of the light sources 120. In other words, the transmission plane 136 is provided on the light guide panel 130 so as to be located in a straight line with the central part of the light source 120 in the leftward and rightward directions (with reference to FIG. 4).

The transmission plane 136 is formed as a curved surface having an arc shape. As shown in FIG. 10, a transmission plane 136a may be formed as an uneven surface having a serration-shaped cross section, as needed. For example, in the case in which light sources 120 configured to emit light having excessively high illuminance are used, the transmission planes 136a may be formed as uneven surfaces. Further, although not shown in the drawings, the transmission planes 136 may be formed as curved surfaces including a plurality of concave parts which are continuously formed, as needed.

Light, which is transmitted by the transmission plane 136 and is thus refracted and enters the light diffusion hole 135, reaches the diffusion plane 137. Here, light having entered the light diffusion hole 135 reaches the diffusion plane 137 using air as a medium. The transmission plane 136 is located in the incidence part 131 of the light guide panel 130.

The diffusion plane 137 is located at the rear of the transmission plane 136 and is thus located in a straight line with the light source 120 and the transmission plane 136. The diffusion plane 137 diffuses light having passed through the light diffusion hole 135 to the outside of the light diffusion hole 135, and the light diffused to the outside is moved to the visual field area part 133 and is radiated to the outside. The diffusion plane 137 may be formed in a curved surface having an arc shape having a predetermined curvature which is smaller than the curvature of the transmission plane 136. The diffusion plane 137 may be formed to be symmetrical with respect to a reference line L (in FIG. 4) which traverses the transmission plane 136 and the light source 120. Further, the diffusion plane 137 is formed in a curved surface which is bent in the opposite direction to the transmission plane 136. The transmission plane 136 is formed in a curved surface which is bent to be convex towards the light source 120, and the diffusion plane 137 is formed in a curved surface which is bent to be convex towards the visual field area part 133 located opposite the light source 120.

The reflection planes 138 provided in a pair are formed between the diffusion plane 137 and the transmission plane 136 and are formed at both ends of the diffusion plane 137 and both ends of the transmission plane 136 so as to be adjacent to each other. The respective reflection planes 138 extend between the ends of the diffusion planes 137 and the ends of the transmission planes 136. Here, the reflection planes 138 extend from the incidence part 131 to the diffusion area part 132.

The reflection planes 138 are formed as inclined surfaces having a predetermined inclination. The reflection planes 138 are formed to have a predetermined inclination from the reference line L which traverses the light source 120 and the transmission plane 136. At least a part of light emitted by the light source 120 is radiated to the reflection planes 138. A part of the light emitted by the light source 120, which is not incident upon the transmission plane 136, is radiated to the reflection planes 138.

The light emitted by the light source 120 is radiated within a predetermined angle of radiation and, for example, may be radiated within 120°. The light emitted by the light source 120 is radiated to the transmission plane 136 and the reflection planes 138.

The reflection planes 138 are configured to reflect the light emitted by the light source 120. As shown by arrows in FIG. 6, the reflection planes 138 reflect a part of the light emitted by the light source 120 to the outside of the light diffusion hole 135. In other words, the reflection planes 138 reflect a part of the light emitted by the light source 120, which is radiated within an angle of total reflection, to the outside of the light diffusion hole 135. Here, the light reflected to the outside of the light diffusion hole 135 reaches the visual field area part 133 using the diffusion area part 132 of the light guide panel 130 as a medium.

The light source 120 emits light within a set angle of radiation. Here, light emitted to the center of the radiation range of the light source 120 is refracted by the transmission plane 136, enters the light diffusion hole 135, is transmitted by the diffusion plane 137, is diffused into the visual field area part 133, and is radiated to the outside. Further, light emitted to the edge of the radiation range of the light source 120 is totally reflected by the reflection planes 138, is diffused to the diffusion area part 132 outside the light diffusion hole 135, is diffused into the visual field area part 133, and is radiated to the outside. The light emitted to the center of the radiation range of the light source 120 has higher luminance than the light emitted to the edge of the radiation range of the light source 120.

As shown by arrows in FIG. 7, the light which is reflected outside the light diffusion hole 135 by the reflection planes 138 (referred to hereinafter as "reflected light") passes through the diffusion area part 132 and is radiated to the visual field area part 133 and overlaps with the light which passes through the light diffusion hole 135 and is diffused to the visual field area part 133 (hereinafter, referred to as "diffused light"). The diffused light is light which is diffused to the visual field area part 133 through the diffusion plane 137 and has higher luminance than the reflected light.

Here, the reflected light is radiated to sections having a relatively low luminance among the entire area of the visual field area part 133, to which the diffused light is radiated, so that luminance of these sections is increased, thereby uniformizing the illuminance of the visual field area part 133.

Further, at least a part of the diffused light and the reflected light is reflected by the inclined plane 134 of the diffusion area part 132 and is radiated to the visual field area part 133.

The light guide panel 130 has the above-descried light diffusion structure and light reflection structure, and thus allows light incident upon the incidence planes 131a to be emitted at uniform illuminance, thereby being capable of obtaining lighting uniformity in the visual field area part 133.

Further, although this embodiment of the present disclosure describes that the reflection planes 138 are formed as flat surfaces and the diffusion plane 137 is formed as a curved surface, reflection planes 138a may be formed such that a plurality of concave parts is continuously arranged, or reflection planes 138b may be formed as a stepwise multi-stage reflective structure, as needed, as shown in FIGS. 11A and 11B. Further, a diffusion plane 137a may be formed as a flat surface, a diffusion plane 137b may be formed such that a plurality of concave parts is continuously arranged, or a diffusion plane 137c may be formed as an uneven surface having a serration-shaped cross section, as needed, as shown in FIGS. 12A-12C.

Further, referring to FIG. 2, in the indoor lighting device according to one embodiment of the present disclosure, the substrate housing 140 and the substrate cover 142 protect the substrate 110 and the light sources 120 assembled with the substrate 110. Further, the light guide panel housing 150 and the light guide panel cover 153 protect the light guide panel 130.

The substrate housing 140 is configured to surround the substrate 110 and the light sources 120 assembled with the substrate 110 so as to support and protect the substrate 110 and the light sources 120 assembled with the substrate 110. The substrate cover 142 is configured to cover the opening of the substrate housing 140 so as to protect the substrate 110 mounted in the substrate housing 140.

The light guide panel housing 150 is configured to surround the bottom part of the light guide panel 130 so as to support and protect the bottom part of the light guide panel 130. The light guide panel cover 153 is assembled with the light guide panel housing 150 so as to cover the diffusion area part 132 of the light guide panel 130 supported by the light guide panel housing 150. The light guide panel housing 150 may be connected to the substrate housing 140 such that the light guide panel housing 150 is loaded or located on a protruding plate 141 of the substrate housing 140. The light guide panel cover 153 is formed in a structure of surrounding the substrate housing 140 and the substrate cover 142 in addition to the diffusion area part 132. The light guide panel cover 153 covers the diffusion area part 132, while exposing the visual field area part 133 of the light guide panel 130.

For example, in the case that the surface of the light guide panel 130 is painted so as to block light emission, the light guide panel cover 153 may be eliminated or reduced.

The light guide panel housing 150 has a protrusion 152 formed adjacent to the rear surface of the light guide panel 130 so as to support the rear surface of the light guide panel 130. Further, the light guide panel housing 150 has a support 151 configured to support the visual field area part 133 of the light guide panel 130. The diffusion area part 132 is located between the light guide panel housing 150 and the light guide panel cover 153 and is supported by the light guide panel housing 150 and the light guide panel cover 153. The rear surface of the light guide panel 130 is supported by the protrusion 152.

The light guide panel housing 150 and the light guide panel cover 153 may be mounted on and coupled to a fixed body of the vehicle. For example, the light guide panel housing 150 and the light guide panel cover 153 may be coupled and fixed to a vehicle body. Further, the substrate housing 140 and the substrate cover 142 may be mounted on and coupled to a fixed body of the vehicle. For example, the substrate housing 140 and the substrate cover 142 may be coupled and fixed to the vehicle body. Further, the substrate housing 140 and the substrate cover 142 may be mounted on and coupled to the light guide panel housing 150 and the light guide panel cover 153 rather than the fixed body of the vehicle.

Figure 13:
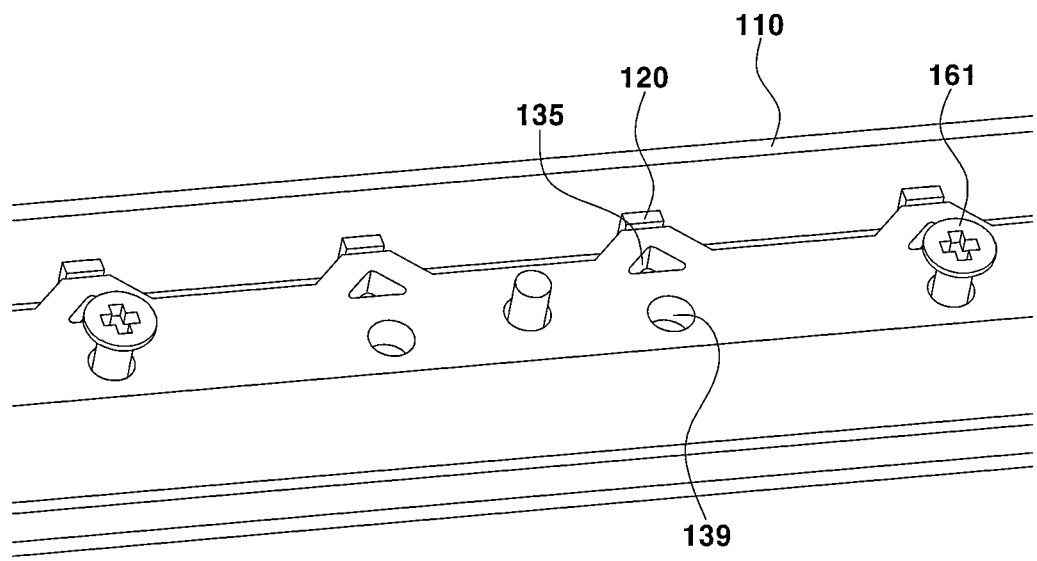
FIGS. 13-17 are views showing indoor lighting devices including light guide panels according to other embodiments of the present disclosure.

Further, referring to FIG. 13, the light guide panel 130 may further include auxiliary light diffusion holes 139 disposed at the rear of the light diffusion holes 135.

The light guide panel 130 is coupled to the light guide panel housing 150 through coupling members 161, such as bolts and nuts. Here, the visual field area part 133 may be shaded by the coupling members 161.

Therefore, the auxiliary light diffusion holes 139 are provided at the rear of the light diffusion holes 135 so as to prevent the visual field area part 133 from being shaded.

Figure 14:
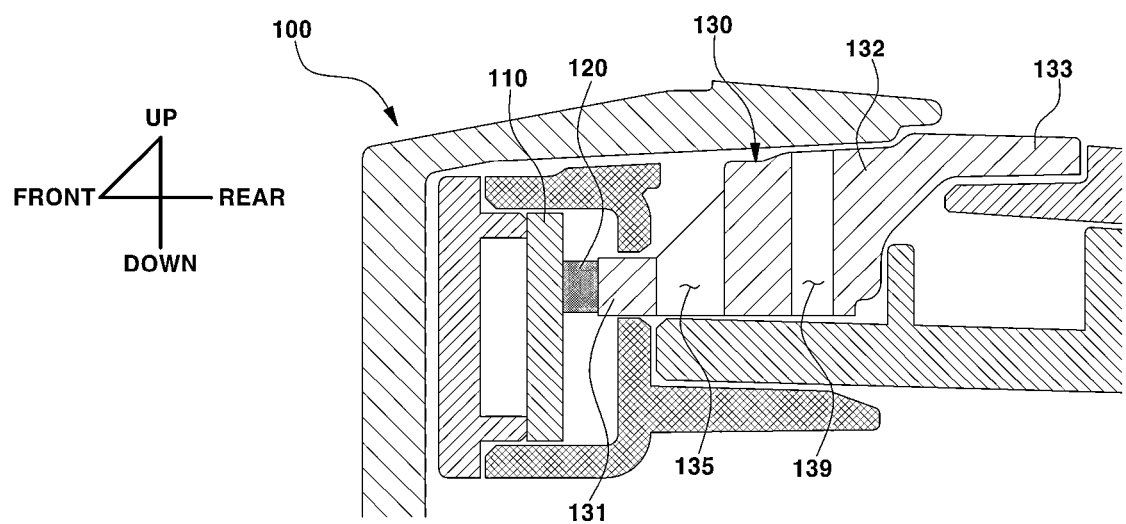
Figure 15:
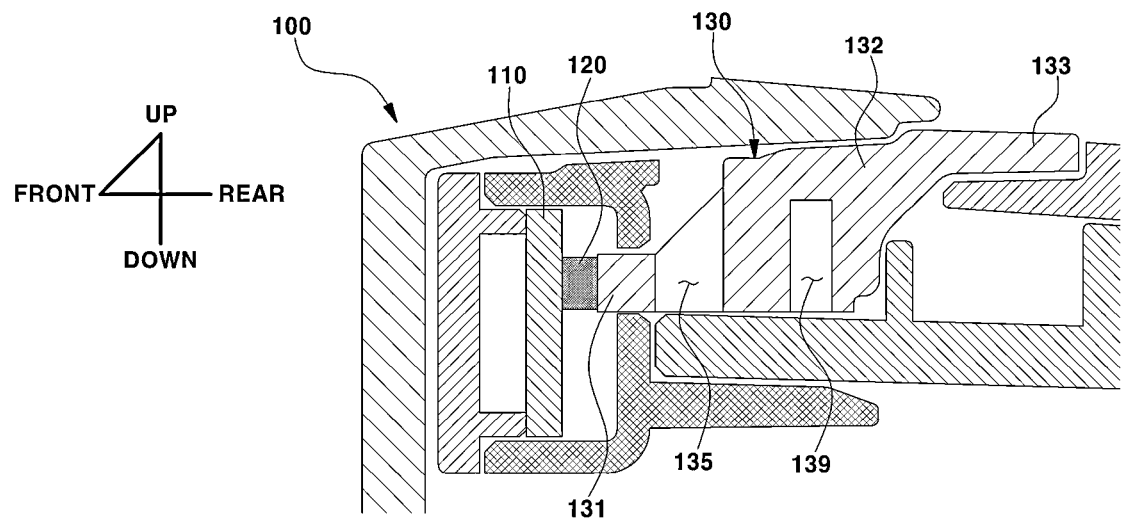
Figure 16:
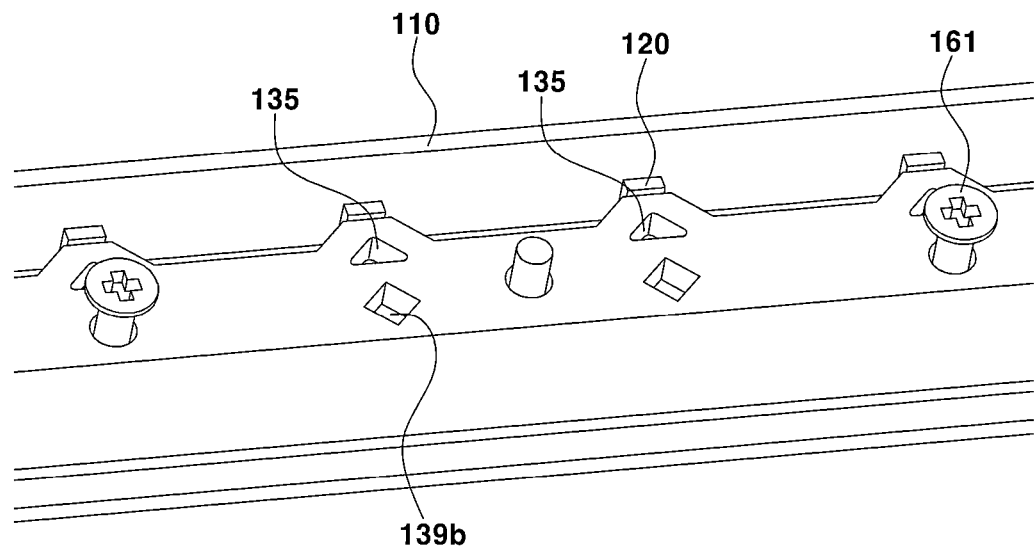
Figure 17:
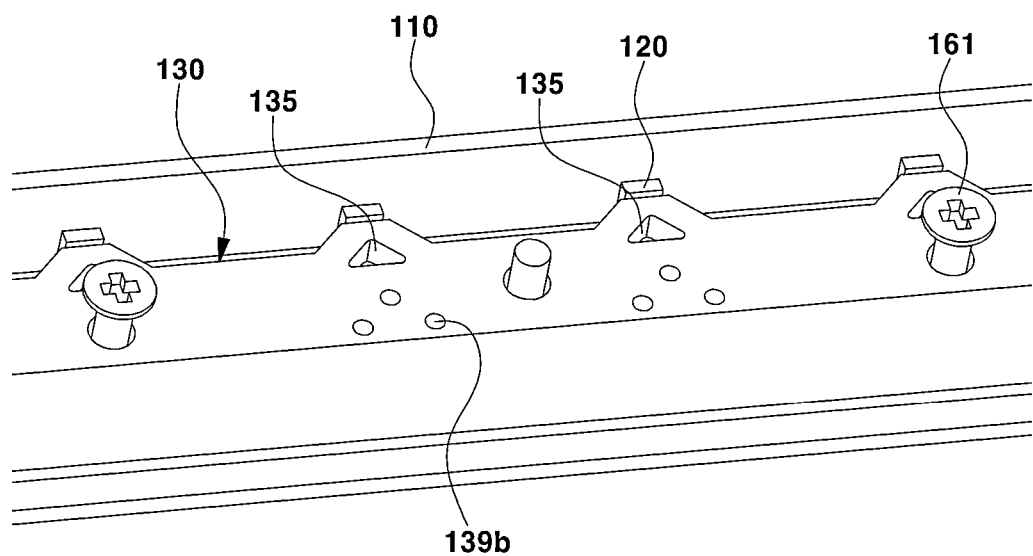

The auxiliary light diffusion holes 139 are configured to secondarily diffuse or refract the light diffused through the light diffusion holes 135. Auxiliary light diffusion holes 139 and 139a according to several embodiments of the present disclosure may be disposed in the diffusion area part 132. The auxiliary light diffusion holes 139 may be formed as through holes, as shown in FIG. 14, or the auxiliary light diffusion holes 139a may be formed as recessed holes, as shown in FIG. 15. Here, the auxiliary light diffusion holes 139 and 139a may be formed as holes having a circular cross section. Alternatively, auxiliary light diffusion holes 139b may be formed as holes having a polygonal cross section, as shown in FIG. 16, or auxiliary light diffusion holes 139c may be formed as a group of a plurality of holes.

The light guide panel 130 may secure sufficient lighting uniformity within a range, which is recognizable by users, by including only the light diffusion holes 135, but may further include the auxiliary light diffusion holes 139, as needed.

Further, as shown in FIG. 18, the light guide panel 130 may omit the light diffusion holes 135 and may include lenses 160 mounted at the positions of the light diffusion holes 135. The lenses 160 may be configured to protect the light sources 120 and to change the direction of radiation of light.

The indoor lighting device configured as above may implement uniform lighting using a relatively small number of light sources 120. Further, the indoor lighting device does not need to employ any separate light diffusion part between the light sources 120 and the light guide panel 130, thus reducing cost and simplifying the structure. In addition, the indoor lighting device may shorten the distance between the light sources 120 and the visual field area part 133, and may thus reduce a product size. Thereby achieving a design that is simple and easy to design, facilitating processing of a mold, and thus reducing investment cost.

The indoor lighting device configured as above may be referred to as a "light source module". In other words, the light source module 100 represented by reference numeral 100 in FIG. 19 may be the indoor lighting device or may include the indoor lighting device. Therefore, a lighting control system of a vehicle according to one embodiment of the present disclosure is described with reference to FIGS. 19-21, with reference to the indoor lighting device of FIG. 3. Further, other figures are referred to as needed.

Figure 19:
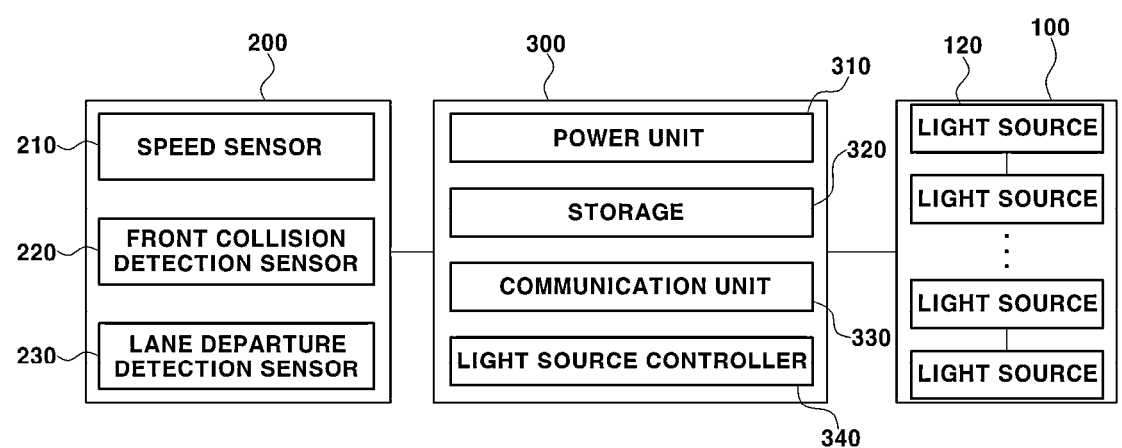
FIG. 19 is a block diagram showing a lighting control system of a vehicle including the indoor lighting device according to one embodiment of the present disclosure.
Figure 20:
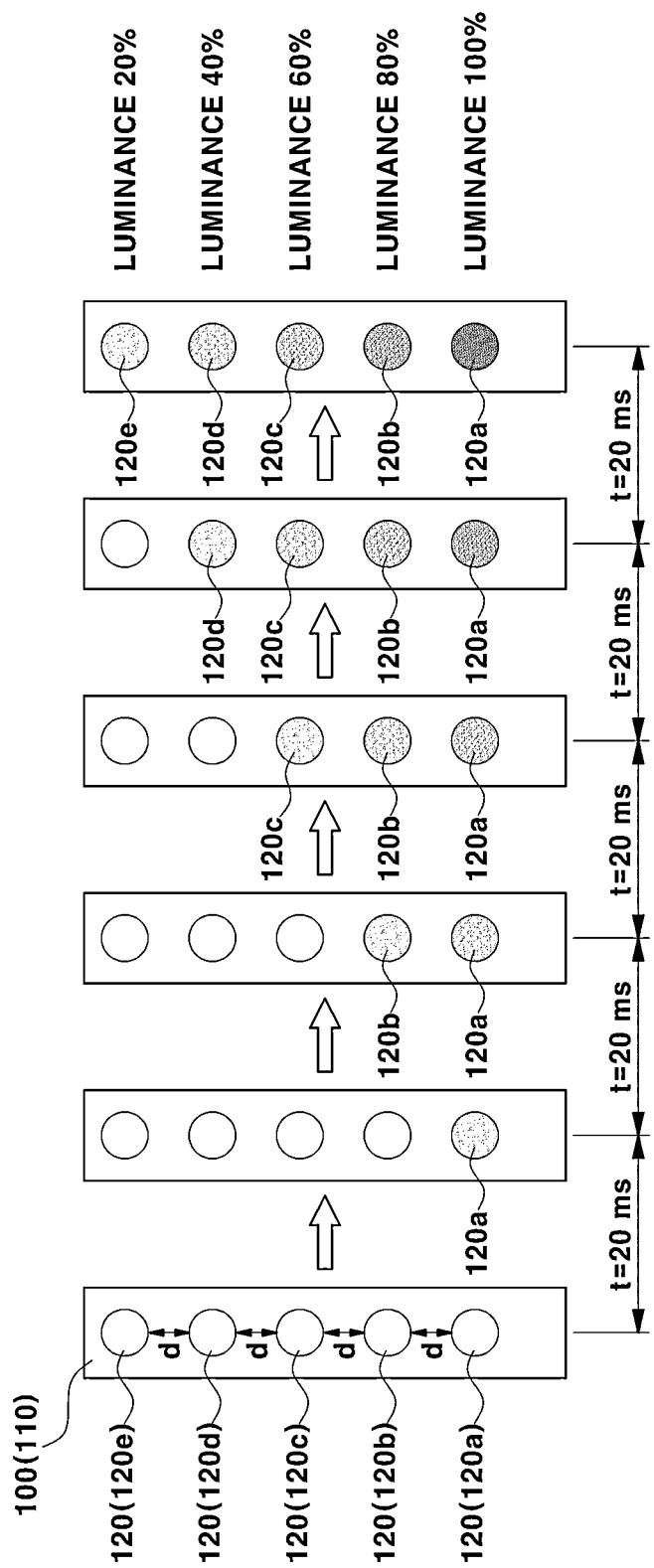
FIGS. 20 and 21 are a conceptual view and a graph illustrating a control method of the lighting control system according to one embodiment of the present disclosure.
Figure 21:
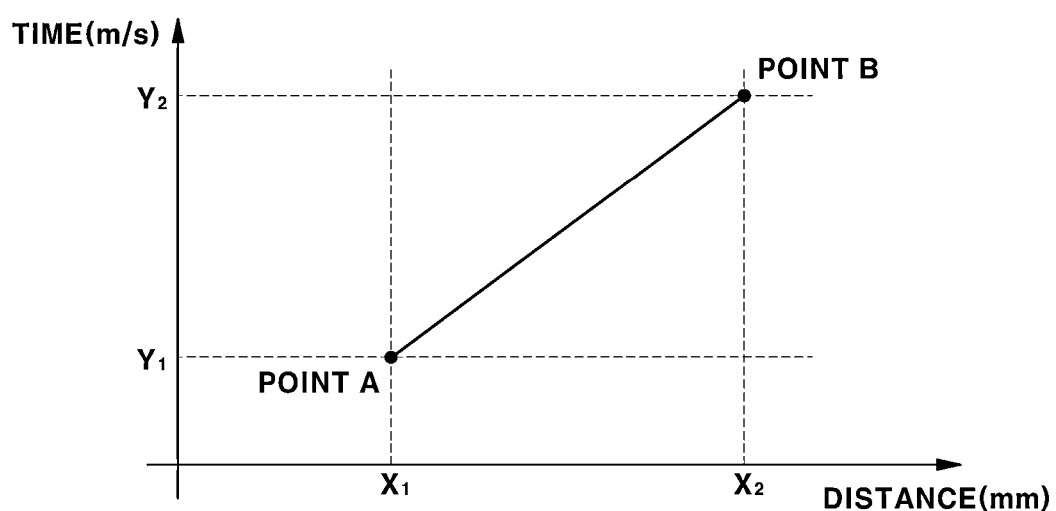

FIG. 19 is a block diagram showing the lighting control system including the indoor lighting device according to one embodiment of the present disclosure. FIGS. 20 and 21 are a conceptual view and a graph illustrating a control method of the lighting control system according to one embodiment of the present disclosure.

As shown in FIG. 19, the lighting control system according to one embodiment of the present disclosure includes the light source module 100, a sensor module 200, and a controller 300.

The light source module 100 includes a plurality of light sources 120 which are connected in series. The light source module 100 is configured in a line-type lighting structure in which the light sources 120 are arranged in a row, as shown in FIG. 3. The light source module 100 may be installed in the interior of the vehicle and may be fixedly mounted on the vehicle body. Here, the light source module 100 may be disposed at a position which is visually easily recognized by a user or a driver in the vehicle.

Each of the light sources 120 includes Red, Green and Blue (RGB) LEDs and an LED driver. The LED driver controls the RGB LEDs based on a signal received from the controller 300. For example, the LED driver controls turning-on, turning-off, and luminance of the RGB LEDs. Here, turning-on and turning-off of the light source 120 may indicate turning-on and turning-off of the RGB LEDs.

The light source module 100 is configured such that there is no shade between the light sources 120. For this purpose, the light sources 120 are arranged at a predetermined distance so as not to generate shade, when the light sources 120 are assembled in a row with the substrate 110, as shown in FIG. 3. In other words, the light sources 120 are arranged in a row with a predetermined distance therebetween.

Concretely, the distance between the light sources 120 may be set to 15 mm to 30 mm. In some examples, the distance between the light sources 120 may be set to 21 mm. The reason for this is that, when the distance between the light sources 120 is reduced, the number of the light sources 120 for implementing line-type lighting is increased and thus manufacturing costs are increased. When the distance between the light sources 120 is increased, shade occurs between the light sources 120 due to the excessively long distance between the light sources 120. The arranged light sources 120 may be sequentially turned on or turned off at a predetermined time difference by the controller 300.

The sensor module 200 senses the driving state of the vehicle and transmits the sensed information to the controller 300. The sensor module 200 is configured to detect speeding, collision, lane departure, and the like of the vehicle.

Concretely, the sensor module 200 includes at least one of a speed sensor 210, a front collision detection sensor 220, or a lane departure detection sensor 230.

The speed sensor 210 senses the real-time speed of the vehicle, and transmits a sensed signal (i.e., a speed value) to the controller 300. The front collision detection sensor 220 senses a distance from a vehicle or an obstacle located in front of the host vehicle, and transmits a sensed signal (i.e., a distance value) to the controller 300. The lane departure detection sensor 230 senses that the vehicle moves out of a lane in which the vehicle is driving and transmits a predetermined signal representing lane departure to the controller 300.

The sensor module 200 may further include various sensors configured to detect state information other than the driving state of the vehicle. For example, the sensor module 200 may further include a door sensor configured to detect opening and closing of a vehicle door, and a start sensor configured to detect the starting state of the vehicle.

The sensor module 200 transmits predetermined information or signals about the driving state of the vehicle to the controller 300 through Local Interconnect Network (LIN) communication.

The controller 300 controls operation of the light source module 100 based on the information or the signals received from the sensor module 200. The controller 300 may include at least one of control units which are provided in advance in the vehicle. The controller 300 may include at least one processor and a non-volatile memory and may include software configured or programmed to perform the function of the controller 300.

Referring to FIG. 19, the controller 300 includes a power unit 310, a storage 320, a communication unit 330, and a light source controller 340.

The power unit 310 receives power to operate the controller 300 and power to operate the light source module 100 from an external power supply. For example, the power unit 310 receives power from a battery mounted in the vehicle so as to operate the controller 300. Further, the power unit 310 is connected to the light source module 100 through an electrical connection unit, such as a cable, and transmits the power of the battery to the light source module 100.

Various kinds of programs configured to perform the function of the controller 300 or the light source controller 340 are stored in the storage 320. Various kinds of information and programs necessary to control the light source module 100 are stored in the storage 320.

The communication unit 330 performs communication with the sensor module 200 and the light source module 100. The communication unit 330 is configured to perform individual communication with the sensors 210, 220 and 230 of the sensor module 200 and the light sources 120 of the light source module 100. The communication unit 300 may communicate with the sensor module 200 and the light source module 100 through Local Interconnect Network (LIN) communication.

The light source controller 340 substantially controls operation of the light source module 100. The light source controller 340 individually controls the light sources 120 of the light source module 100 through serial communication. Here, the light sources 120 are turned on or turned off and luminances of the light sources 120 are controlled, based on control signals received from the light source controller 340

Here, control of the light source module 100 or the light sources 120 by the light source controller 340 may indicate control of the light source module 100 or the light sources 120 by the controller 300.

The controller 300 may control operation of the light source module 100 so as to provide visual information to a user. The controller 300 determines the driving state of the vehicle in real time based on information received from the sensor module 200, and controls operation of the light source module 100 depending on results of the determination. That is to say, the controller 300 individually controls the order of turning on the light sources 120 and luminances of the light sources 120 based on the driving state of the vehicle.

The controller 300 may control operation of the light sources 120 based on the information received from the sensor module 200 and may thus visually provide warning information to a driver immediately when an emergency occurs, such as when the vehicle moves out of a lane in which the vehicle is driving or when it is expected that the vehicle will collide with a front vehicle, thereby being capable of guiding the driver to safe driving.

In other words, the light source module 100 is operated under the control of the controller 300 and may thus not only function to brighten the interior of the vehicle but also to visually provide predetermined information or warning to the driver.

When the controller 300 determines that the vehicle enters a speeding state of a predetermined speed or more based on information received from the speed sensor 210, or determines that the vehicle has a risk of colliding with a front vehicle based on information received from the front collision detection sensor 220, or determines that the vehicle moves out of a lane in which the vehicle is driving based on information received from the lane departure detection sensor 230, the controller 300 operates the light sources 120 under predetermined conditions.

The controller 300 sequentially individually turns on the light sources 120 in predetermined order. Concretely, the controller 300 sequentially turns on the light sources 120, arranged in a row on the substrate 110, in a direction of arrangement of the light sources 120.

For example, the controller 300 may sequentially turn on the light sources 120 in ascending order, i.e., from the first light source 120 to the $N^{th}$ light source 120, or in descending order, i.e., from the $N^{th}$ light source 120 to the first light source 120. Further, the controller 300 may sequentially turn on the light sources 120 in a manner in which the $M^{th}$ light source 120 to the first light source 120 and the $M^{th}$ light source 120 to the $N^{th}$ light source 120 are sequentially turned on simultaneously. Here, the first light source 120 and the $N^{th}$ light source 120 may indicate the light sources 120 disposed at both ends of the light source module 100 in the length direction thereof, and the $M^{th}$ light source 120 may indicate the light source 120 disposed at the center of the light source module 100 in the length direction thereof. The length direction of the light source module 100 may indicate the direction of arrangement of the light sources 120. Further, the ends of the light source module 100 in the length direction thereof may be the right end and the left end of the light source module 100.

Further, when the controller 300 turns on the light sources 120, the controller 300 sequentially turns on the light sources 120 with a predetermined time difference. The reason for this is to implement an effect in which the light sources 120 are smoothly consecutively turned on from a user's or driver's point of view.

Concretely, the controller 300 sequentially turns on the light sources 120 at a time interval of 20 ms to 30 ms. Here, the time interval or time difference when the light sources 120 are sequentially turned on will be defined as a "turning-on time interval t" or a "turning-on interval t".

The turning-on interval t between the light sources 120 is set based on a perception reaction time (PRT) which is a time that elapses from the instant that a driver recognizes visual information to the instant that the driver takes appropriate action. When the light sources 120 are turned on within the minimum time taken for a user or a driver to see and recognize an article, the user or the driver recognizes that the light sources 120 are consecutively turned on. The PRT may include a recognition time taken for the user or the driver to determine a dangerous situation and a reaction time taken for the user or the driver to operate a braking device or the like in response to the dangerous situation.

That is to say, in order to allow the user or the driver to recognize that the light sources 120 are consecutively turned on without interruption, the controller 300 sequentially turns on the light sources 120 at the turning-on time interval t of 20 ms to ms. Here, the light sources 120 are arranged to be spaced apart from each other by a distance d of 15 mm to 30 mm.

When the turning-on time interval between the light sources 120 is less than ms, the driver may erroneously recognize sequential turning-on of the light sources 120 as simultaneous turning-on of the light sources 120 and may not clearly recognize a sequential turning-on pattern. For example, during driving of the vehicle at a high speed of 100 km/h or more, in order to allow the driver to recognize a turning-on pattern of the light sources 120 and then to react to the turning-on pattern, one cycle of the turning-on pattern of the light sources 120 should be completed within 0.9 seconds.

Further, when the turning-on time interval between the light sources 120 exceeds 30 ms, the driver may not recognize sequential turning-on of the light sources 120 as having the meaning of predetermined information or warning and may thus not rapidly cope with a dangerous situation.

Further, the sequential turning-on speed of the light sources 120 is determined based on the distance d between the light sources 120 and the turning-on interval (i.e., the turning-on time interval) t between the light sources 120. The sequential turning-on speed is a speed at which the light sources 120 arranged in a row are sequentially turned on, and the sequential turning-on speed is inversely proportional to the distance d between the light sources 120 and is directly proportional to the lighting-on interval t between the light sources 120.

When the turning-on time interval t between the light sources 120 is 20 ms and the distance d between the light sources 120 is 15 mm to 30 mm, the sequential turning-on speed of the light sources 120 is 0.75 m/s to 1.5 m/s. For example, when the distance d between the light sources 120 is 21 mm and the turning-on time interval t between the light sources 120 is 20 ms, the sequential turning-on speed of the light sources 120 may be 1.05 m/s.

Further, the controller 300 may increase the sequential turning-on speed of the light sources 120, as the driving speed of the vehicle increases. The reason for this is that, as the driving speed of the vehicle increases, the visual recognition time of the driver gets short. In other words, the controller 300 may increase the sequential turning-on speed of the light sources 120 in direct proportion to the speed of the vehicle.

Moreover, when the turning-on interval t between the light sources 120 exceeds the maximum value in the predetermined range (i.e., 20 ms to 30 ms), the driver may feel a sense of disconnection in which the light sources 120 are discontinuously turned on.

Therefore, when the controller 300 turns on the light sources 120, the controller 300 controls luminances of the light sources 120 in a fade manner so that the driver does not visually feel a sense of disconnection when the light sources 120 are sequentially turned on. In other words, when the controller 300 turns on the light sources 120, the controller 300 may increase luminances of the respective light sources 120 in stages.

Referring to FIG. 20, the controller 300 may turn on the first light source 120a, which is the first one to be turned on among the light sources 120 provided on the light source module 100, at a first luminance, and increases the luminance of the first light source 120*a* from the first luminance to a second luminance when the second light source 120*b*, which is one to be turned on after the first light source 120*a*, is turned on. Here, the second light source 120*b* is turned on at the first luminance. The second light source 120*b* is a light source which is arranged closest to the first light source 120*a*, among the light sources 120 which are not turned on.

Here, the second luminance is set to a luminance value increased from the first luminance by a predetermined ratio. In other words, the controller 300 may increase luminance of each light source 120 by the predetermined ratio when the controller 300 sequentially turns on the light sources 120.

In more detail, the controller 300 turns on one of the light sources 120 provided on the light source module 100, i.e., the first light source 120*a*, at the predetermined first luminance when the controller 300 turns on the first light source 120*a*, and increases the luminance of the first light source 120*a* from the first luminance to the second luminance when the controller 300 turns on the light source 120 arranged closest to the first light source 120*a*, i.e., the second light source 120*b*. Here, the controller 300 turns on the second light source 120*b* at the first luminance.

Thereafter, the controller 300 turns on the third light source 120*c* which is arranged closest to the second light source 120*b*, among the light sources 120 which are not turned on, at the first luminance after the predetermined turning-on interval t from turning-on of the second light source 120*b* has elapsed, and at this time, increases the luminance of the first light source 120*a* from the second luminance to a third luminance, and increases the luminance of the second light source 120*b* from the first luminance to the second luminance.

Thereafter, the controller 300 turns on the fourth light source 120*d* which is arranged closest to the third light source 120*c*, among the light sources 120 which are not turned on, at the first luminance after the predetermined turning-on interval t from turning-on of the third light source 120*c* has elapsed, and at this time, increases the luminance of the first light source 120*a* from the third luminance to a forth luminance, increases the luminance of the second light source 120*b* from the second luminance to the third luminance, and increases the luminance of the third light source 120*c* from the first luminance to the second luminance.

Thereafter, the controller 300 turns on the fifth light source 120*e* at the first luminance in the above-described manner and increases the luminances of the first light source 120*a*, the second light source 120*b*, the third light source 120*c* and the fourth light source 120*d* by the predetermined ratio.

Here, the luminances of the light sources 120 are increased in order of the first luminance, the second luminance, the third luminance. For example, the first luminance may be 20%, and the predetermined ratio may be 20%. In other words, the first luminance may be 20%, the second luminance may be 40%, the third luminance may be 60%, the fourth luminance may be 80%, and the fifth luminance may be 100%. When the fifth light source 120*e* is turned on, the luminance of the first light source 120*a* becomes 100%.

When the luminances of the light sources 120 are gradually increased as the light sources 120 are sequentially turned on, the sense of disconnection visually felt by the driver when the light sources 120 are turned on more slowly than the predetermined turning-on interval t may be eliminated, and the effect in which the light sources 120 are more smoothly consecutively turned on may be implemented.

When the light sources 120 are turned on in the above-described fade manner, the turning-on interval t between the light sources 120 may be increased up to 50 ms. In other words, when the light sources 120 are sequentially turned on in the fade manner, the turning-on interval t between the light sources 120 may be set to 20 ms to 50 ms.

The distance d between the light sources 120 and the turning-on interval t between the light sources 120 may be determined as set forth in the graph shown in FIG. 21. For example, as shown in FIG. 21, when the distance d between the light sources 120 is reduced from X2 to X1, the turning-on interval t between the light sources 120 is shortened from Y2 to Y1.

Further, the controller 300 may implement a predetermined turning-on scenario when the controller sequentially turns on the light sources 120, thereby allowing the driver to recognize the kind of information or warning.

Here, the predetermined turning-on scenario is set such that one cycle thereof is completed within 0.9 seconds. The reason for this is that, when a time taken to perform one cycle of the turning-on scenario is shorter than the recognition time of the driver, the driver may recognize the turning-on scenario as a warning or information, and may react to the warning or the information. The time taken to perform one cycle of the turning-on scenario decreases, as the driving speed of the vehicle increases. The reason for this is that, as the driving speed of the vehicle increases, the visual recognition time of the driver is shortened.

Further, in the case that a turning-on scenario of a fast tempo is implemented, the turning-on scenario may be implemented dynamically by shortening the turning-on interval t between the light sources 120. In the case that a turning-on scenario of a slow tempo is implemented, the turning-on scenario may be implemented smoothly by lengthening the turning-on interval t between the light sources 120.

As is apparent from the above description, the present disclosure provides the following effects through the above-described configuration and connection and usage relations.

First, an indoor lighting device of a vehicle according to the present disclosure may effectively reduce a illuminance difference of light radiated to a visual field area part of a light guide panel so as to provide lighting having uniform illuminance. Additionally, the indoor lighting device may provide lighting having uniform illuminance using a relatively small number of light sources.

Second, the indoor lighting device does not need to employ any separate light diffusion part between the light sources and the light guide panel, thus the indoor lighting device is capable of achieving cost reduction and structure simplification.

Third, the indoor lighting device may shorten the distance between the light sources and the visual field area part of the light guide panel, and may thus reduce a product size, thereby making it easier to design, facilitating processing of a mold, and thus reducing investment cost.

Fourth, a lighting control system of a vehicle according to the present disclosure sequentially turns on the light sources of the indoor lighting device at a predetermined turning-on interval, thereby being capable of not only functioning to brighten the interior of the vehicle but also visually providing predetermined information or warning to a driver.

Fifth, the lighting control system controls operation of the light sources based on information received from a sensor module, and thus visually provides warning information to the driver immediately when an emergency occurs, such as when the vehicle moves out of a lane in which the vehicle is driving or when it is expected that the vehicle will collide with a vehicle in front of a vehicle including the lighting control system, thereby being capable of guiding the driver to improve safety during driving.

The disclosure has been described in detail with reference to embodiments thereof. However, it should be appreciated by those of ordinary skill in the art that changes may be made in these embodiments without departing from the principles and spirit of the present inventive concept, the scope of which is defined in the appended claims and their equivalents.

What is claimed is:

1. An indoor lighting device of a vehicle, comprising:
    a substrate;
    a plurality of light sources assembled with the substrate to be arranged in a row; and
    a light guide panel comprising:
        a plurality of incidence parts configured such that light emitted by the light sources is incident upon the plurality of incidence parts,
        a diffusion area part provided behind the incidence parts and configured to diffuse and reflect the light incident upon the incidence parts,
        a visual field area part provided behind the diffusion area part and configured to emit the light diffused and reflected by the diffusion area part to an outside of the indoor lighting device, and
        light diffusion holes provided behind the respective incidence parts and configured such that each of the light diffusion holes is surrounded by a transmission plane, a pair of reflection planes and a diffusion plane.

2. The indoor lighting device of claim 1, wherein the transmission plane is formed in a corresponding one of the incidence parts to face a corresponding one of the light sources and is configured to transmit a part of the light emitted by the corresponding one of light sources, the diffusion plane is configured to diffuse light, having transmitted by the transmission plane and having passed through a corresponding one of the light diffusion holes, to the visual field area part, and the respective reflection planes are configured to reflect a part of the light emitted by the corresponding one of the light sources to an outside of the corresponding one of the light diffusion holes to radiate the part of the light to the visual field area part.

3. The indoor lighting device of claim 1, wherein the transmission plane is formed in a curved surface bent to be convex towards the corresponding one of the light sources.

4. The indoor lighting device of claim 1, wherein the diffusion plane is formed in the diffusion area part and is formed in a curved surface bent to be convex towards the visual field area part.

5. The indoor lighting device of claim 1, wherein the respective reflection planes are formed as inclined surfaces having a predetermined inclination between the transmission plane and the diffusion plane.

6. The indoor lighting device of claim 1, wherein the light diffusion holes are formed to have a fan-shaped cross section.

7. The indoor lighting device of claim 1, wherein the incidence parts protrude from a lower part of a front surface of the diffusion area part, the visual field area part extends from an upper part of a rear surface of the diffusion area part, and the diffusion area part has an inclined plane configured to reflect at least a part of light, radiated to the visual field area part through the diffusion plane, to the visual field area part.

8. The indoor lighting device of claim 7, wherein the inclined plane is formed on a rear surface of the diffusion area part to be inclined and is provided adjacent to the visual field area part.

9. The indoor lighting device of claim 2, wherein the light which is reflected outside the light diffusion hole by the reflection planes passes through the diffusion area part and is radiated to the visual field area part and overlaps with the light which passes through the light diffusion hole and is diffused to the visual field area part.

10. A lighting control system of a vehicle, comprising:
    a light source module comprising a plurality of light sources arranged in a row to be spaced apart from each other by a predetermined distance, the light source module disposed in an interior of the vehicle;
    a sensor module configured to detect a driving state of the vehicle; and
    a controller configured to sequentially turn on the plurality of light sources at a predetermined turning-on interval based on information received from the sensor module.

11. The lighting control system of claim 10, wherein the light sources are sequentially turned on in a direction of arrangement thereof by the controller.

12. The lighting control system of claim 10, wherein the controller is configured to:
    turn on a first light source at a predetermined luminance when turning on the first light source among the light sources, and
    turn on a second light source with a predetermined luminance and increase the luminance of the first light source by a predetermined ratio when the second light source arranged closest to the first light source among the light sources is turned on.

13. The lighting control system of claim 10, wherein the distance between the light sources is 15 mm to 30 mm, and the turning-on interval between the light sources is ms to 30 ms.

14. The lighting control system of claim 10, wherein the sensor module comprises at least one of a speed sensor, a front collision detection sensor, or a lane departure detection sensor.

15. The lighting control system of claim 10, wherein the light source module comprises:
    a substrate;
    a plurality of light sources assembled with the substrate to be arranged in a row; and
    a light guide panel comprising a plurality of incidence parts configured such that light emitted by the light sources is incident upon the plurality of incidence parts, a diffusion area part provided behind the incidence parts and configured to diffuse and reflect the light incident upon the incidence parts, a visual field area part provided behind the diffusion area part and configured to emit the light diffused and reflected by the diffusion area part to an outside of the light source module, and light diffusion holes provided behind the respective incidence parts and configured such that each of the light diffusion holes is surrounded by a transmission plane, a pair of reflection planes and a diffusion plane.

16. The lighting control system of claim 15, wherein the transmission plane is formed in a corresponding one of the incidence parts to face a corresponding one of the light sources and is configured to transmit a part of the light emitted by the corresponding one of light sources, the diffusion plane is configured to diffuse light, having transmitted by the transmission plane and having passed through a corresponding one of the light diffusion holes, to the visual field area part, and the respective reflection planes are configured to reflect a part of the light emitted by the corresponding one of the light sources to an outside of the corresponding one of the light diffusion holes to radiate the part of the light to the visual field area part.

17. The lighting control system of claim 16, wherein the transmission plane is formed in a curved surface bent to be convex towards the corresponding one of the light sources.

18. The lighting control system of claim 16, wherein the diffusion plane is formed in the diffusion area part and is formed in a curved surface bent to be convex towards the visual field area part.

19. The lighting control system of claim 16, wherein the respective reflection planes are formed as inclined surfaces having a predetermined inclination between the transmission plane and the diffusion plane.

20. The lighting control system of claim 16, wherein the light diffusion holes are formed to have a fan-shaped cross section.

21. The lighting control system of claim 16, wherein the incidence parts protrude from a lower part of a front surface of the diffusion area part, the visual field area part extends from an upper part of a rear surface of the diffusion area part, and the diffusion area part has an inclined plane configured to reflect at least a part of light, radiated to the visual field area part through the diffusion plane, to the visual field area part.

22. The lighting control system of claim 21, wherein the inclined plane is formed on a rear surface of the diffusion area part to be inclined and is provided adjacent to the visual field area part.

* * * * *